Jan. 20, 1953

C. P. BALDWIN 2,625,913

HIGH-PRESSURE FLUID HYDRAULIC PROPULSION
SYSTEM HAVING MEANS FOR AVOIDING SHOCKS

Filed Jan. 18, 1947

Inventor:
Clyde P. Baldwin.
by Louis A. Mahon.
Att'y.

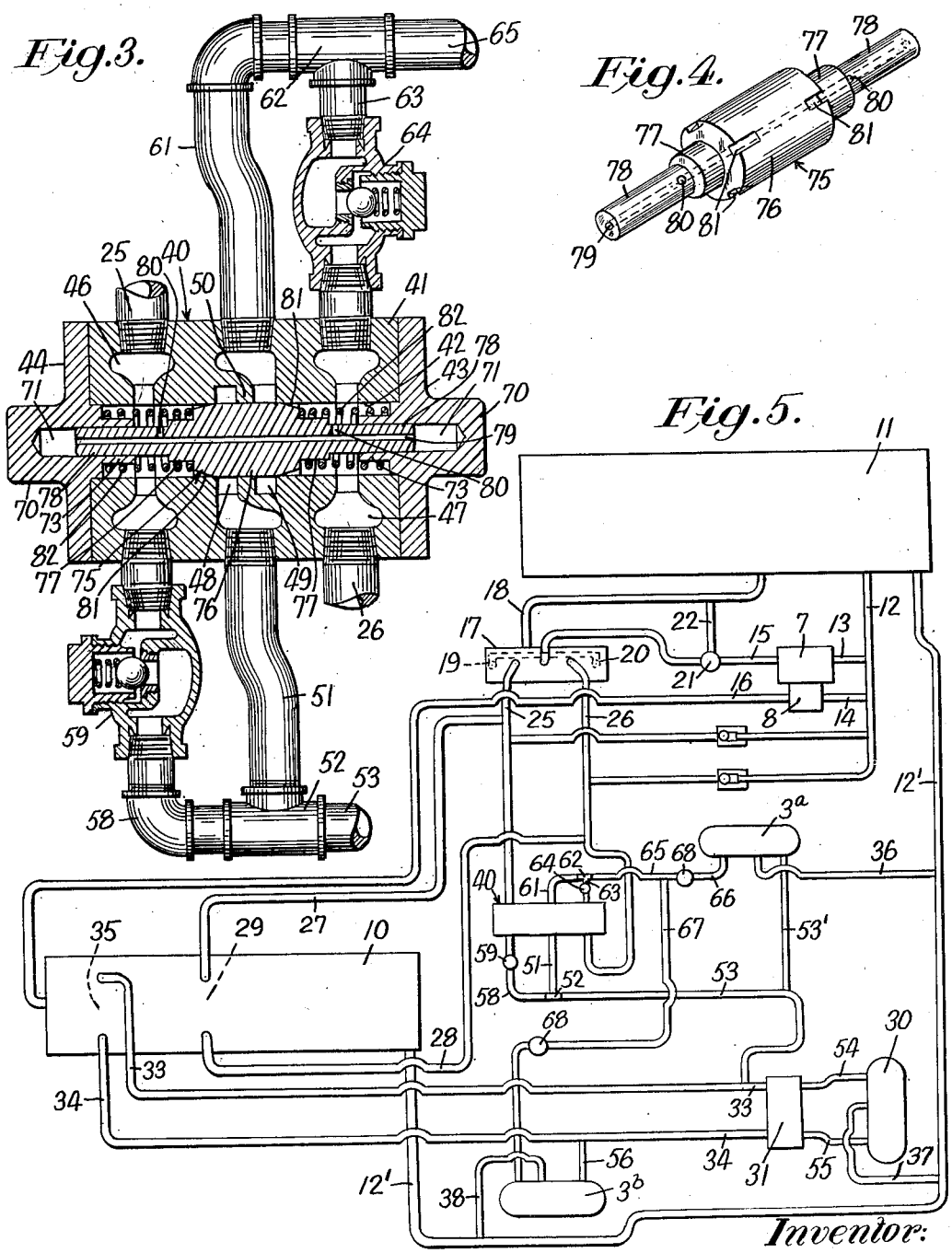

Patented Jan. 20, 1953

2,625,913

UNITED STATES PATENT OFFICE 2,625,913

HIGH-PRESSURE FLUID HYDRAULIC PROPULSION SYSTEM HAVING MEANS FOR AVOIDING SHOCKS

Clyde P. Baldwin, Claremont, N. H., assignor to Joy Manufacturing Company, a corporation of Pennsylvania Application January 18, 1947, Serial No. 722,807

22 Claims. (Cl. 121—46.5)

My invention relates to propulsion systems for vehicles, and more particularly to hydraulic propulsion systems having means for reducing the shocks imposed on the vehicles when fluid under high pressure is admitted to the propulsion motor or motors thereof.

In the application of Harry A. Vanderzee and myself, Serial No. 578,084, now Patent No. 2,562,881, there is shown a propulsion system for a coal cutting machine in which a liquid under a relatively high pressure, several hundred pounds per square inch, is used to effect propulsion of the machine. The controlling system for the wheel drive of this machine provides for the requisite operations, but is dependent upon careful manipulation of the controls by the operator for the avoidance of shocks to the mechanism when, for example, starting the machine from rest, for cutting or tramming operation.

It is an object of my invention to provide an improved hydraulic propulsion system for a vehicle such as, but without limitation thereto, a coal cutting machine. enabling the utilization of liquid under high pressure to drive the wheels of the vehicle, and providing, without dependence on the skill and care of the operator, for the avoidance of substantial shocks to the mechanism when liquid is admitted to the propulsion motors. It is another object of my invention to provide an improved automatic valve mechanism, governed by the liquid supplied to effect propulsion of the wheel driving motors of a vehicle, for preventing the imposition of sudden shocks when the liquid is admitted to the conduits for transmission to the wheel driving motors. It is a further object of my invention to provide an improved automatic control device for the lines leading to the hydraulic propulsion motors of a vehicle for initially admitting only a small quantity of fluid and then increasing the quantity of fluid admitted at an appropriate rate until the maximum flow permitted by the master control valve is delivered, all in such manner as to avoid sudden jolting of the vehicle and shocks to the mechanism. Other objects and advantages of my invention will hereinafter more fully appear.

In the accompanying drawings, in which one embodiment of my invention is shown for purposes of illustration, Fig. 1 is a fragmentary plan view of a kerf cutting machine in which the illustrative embodiment is incorporated.

Fig. 3 is a central sectional view through the mechanism of Fig. 2 on a plane parallel to the plane of the sheet on which Fig. 2 appears and on an enlarged scale.

Fig. 4 is a perspective view of a valve element.

Fig. 5 is a diagrammatic view showing the control system as a whole.

Figure 1:
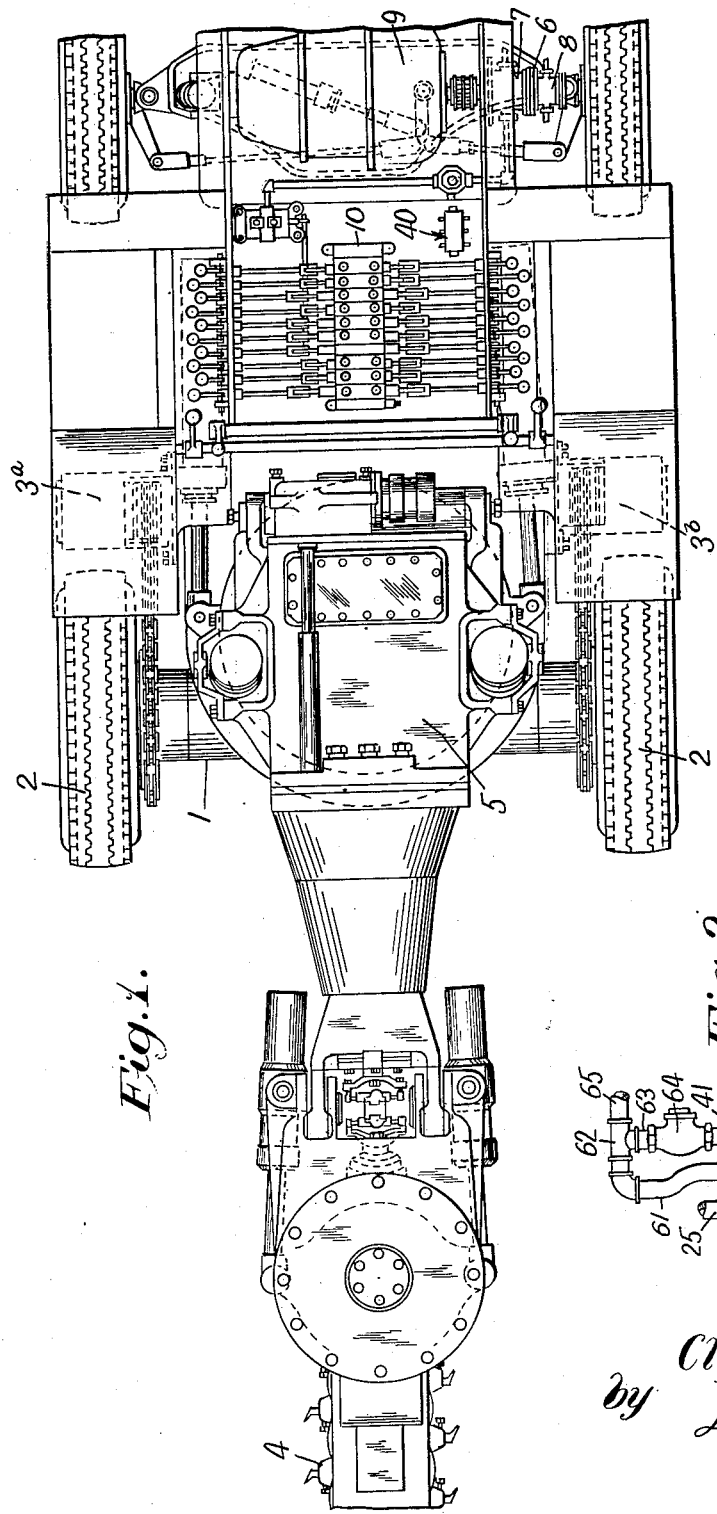
Figure 2:
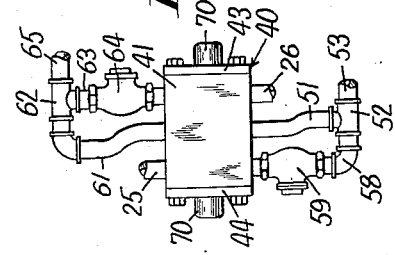
Fig. 2 is an elevational view of an automatic control valve mechanism forming a portion of the control system.

Referring to the drawings and first to Fig. 1, it will be observed that a kerf cutting machine 1 is illustrated as a setting for the invention. It will be understood, however, that other hydraulically propelled vehicles may equally well be used for the embodiment of the invention. The kerf cutting machine of Fig. 1 includes front propulsion wheels 2 having individual reversible driving motors 3$^a$ and 3$^b$. The machine has a cutting mechanism 4, supported, adjustable, and driven through mechanism illustrated in the aforementioned patent, the drive being by means of a suitable motor 5. Propulsion of the vehicle. as well as numerous adjustments of its parts which do not enter into the present invention but which are described in said joint application, may be effected by dual pump mechanism 6, including a large capacity pump 7 and a small capacity pump 8, both pumps being driven by a motor 9, herein distinct from the motor 5. The hydraulic fluid pumped by the small capacity pump 8 is under high pressure and has its distribution controlled by a valve box 10 having therein numerous valve devices of which only two are of present concern. This valve mechanism is also illustrated in the application of said Vanderzee and myself last referred to. The fluid pumped by the large capacity pump 7 is also under high pressure, and is controlled as later described.

Referring now to the diagram of Fig. 5, it will be observed that a tank or reservoir 11 suitably supported on the vehicle 1 is connected by a conduit 12, and branch conduits 13 and 14 respectively, with the intakes of the large and small capacity pumps 7 and 8. The pump discharges are respectively connected to conduits 15 and 16. The discharge conduit 15 of the large capacity pump 7 leads to a conventional manually controllable four-way valve device 17, which has its valve receiving bore appropriately connected by a conduit 18 back to the tank 11. The conduit 18 communicates with the bore of the valve mechanism 17 at spaced points through ports 19 and 20. The large capacity pump discharge conduit 15 has a relief valve 21 therein connected by a conduit 22 to the conduit 18, and this relief valve is set to open automatically in the event the pressure in the system exceeds a predetermined maximum, thereby to prevent overloading of the system. Also leading from the valve receiving bore of the four-way valve device are conduits 25 and 26 which constitute the conduits through which fluid is supplied from the large capacity pump 7 to effect the propulsion of the truck by means of the wheel driving motors 3a and 3b.

The discharge conduit 16 from the small capacity pump leads to one end of the valve box 10, while an exhaust or return line 12' is connected to the other end of the valve box 10. Conduits 27 and 28 lead from the valve box 10 and communicate with the conduits 25 and 26 respectively, and a valve device 29, shown in detail in the above mentioned application of said Vanderzee and myself, is provided for selectively connecting the small pump discharge or the exhaust line 12' with the conduits 27 and 28, supply to the line 27 being accompanied by venting from the line 28, and vice versa.

For the supply of electric current to the motors 5 and 9, a hydraulic reel driving motor 30 having associated with it automatic control mechanism 31, all as described in the aforementioned copending application, may be provided, the mechanism 31 serving to cause actuating fluid to pass through the reel driving motor 30 when the wheel driving motors 3a and 3b are being rotated in a direction to cause the vehicle to move toward the point of attachment of the cable associated with the reel, but to permit bypassing of the fluid without entering the reel driving motor when the vehicle is being moved in a direction away from the point of attachment of the cable, and to interconnect the supply and exhaust connections for the reel driving motor so that said motor may be turned without substantial resistance during the paying off of the cable. Conduits 33 and 34 lead from the valve box 10 to the automatic control valve mechanism 31 and may be controlled by a reel motor control valve 35 of conventional form, fully described in the copending application mentioned, to enable reel drive without truck wheel drive. Leakage connections 36, 37 and 38 extend from wheel driving motor 3a, reel driving motor 30, and wheel driving motor 3b to the return line 12'.

The shock preventer previously mentioned is generally designated 40. It includes a casing 41 having an axial bore 42 and end heads 43 and 44. The conduit 25 leading from the valve box 17 and adapted also to receive fluid from the small capacity pump through the conduit 27 opens into an annular chamber 46 surrounding the valve bore 42 near one end of the latter. The conduit 26, leading from the valve box 17 and adapted also to receive fluid from the small capacity pump through the conduit 28, opens into an annular recess 47 surrounding the valve bore 42 near the other end of the latter. The annular recesses or chambers 46 and 47 each communicate freely with the valve bore. Two other annular chambers 48 and 49 surround and communicate freely with the valve bore 42 near the central portion thereof, these chambers being separated from each other by an annular wall 50. The chamber 48 is connected by a conduit 51 with a T 52, one end of which communicates through a conduit 53 with the conduit 33 which leads to the automatic control device 31; and conduit 53 has a branch 53' which leads to one of a pair of alternatively fluid supply and fluid exhaust connections for the wheel driving motor 3a. The valve device 31 is connected by conduits 54 and 55 with the reel driving motor 30, and when fluid is supplied through the conduit 53 or through the conduit 33 to the valve device 31, such fluid passes through the conduit 54 to the reel driving motor 30 and drives the latter, then passes through the conduit 55 to the valve device 31 and to the conduit 34 and from the latter through a branch conduit 56 into that one of the pair of alternatively supply and exhaust connections of the wheel driving motor 3b which corresponds to the connection of driving motor 3a to which the conduit 53' leads. Before going on, it may be again mentioned that when fluid is supplied to the conduit 34, whether from the valve device 35 or as exhausted through the conduit 56 from the motor 3b, this fluid simply bypasses through the automatic control mechanism 31 to the line 33 without entering the reel driving motor 30, which at this time has its supply and exhaust connections in free communication with each other.

Referring again to the T 52, the other side thereof is connected by a conduit 58 and a suitable check valve device 59 with the annular chamber 46. As a result, it will be evident that fluid admitted to the chamber 46 from the conduit 25 cannot flow past the check valve device 59 into the conduit 53, but fluid passing from the conduit 53 towards the chamber 46 may freely unseat the check valve 59 and enter the chamber 46 and pass through the conduit 25 to the valve mechanism 17 when the conduit 25 is connected with the return line 18 through the port 19.

The annular chamber 49 is connected by a short conduit 61 with a T 62; and from the T 62 a branch 63, containing a check valve device 64 corresponding to the check valve device 59, opens into the annular chamber 47. Another conduit 65 leads from the T 62 and this is connected by branches 66 and 67, each containing a manually adjustable stop valve 68, with the others of the pairs of alternatively fluid supply and fluid exhaust connections for the wheel driving motors 3a and 3b. Conduit 66 leads to the other alternatively supply and exhaust connection for the wheel driving motor 3a (note that the first of these supply and exhaust connections has the conduit 53' connected with it). The conduit 67 leads to the one of the alternatively supply and exhaust connections of the wheel driving motor 3b not connected with the conduit 56. As a result of these arrangements, it will be understood that fluid may pass freely towards the chamber 47 from the conduit 65, past the check valve device 64, but cannot flow in the opposite direction through the connection 63.

The heads 43 and 44 each have bosses 70 projecting therefrom and each has a bore 71 therein, the ends of these bores opening into the valve bore 42 through a projecting spring centering sleeve-like portion 73. Within the bore 42 there is slidably received a valve element 75 consisting of a central portion 76 constituting a close sliding fit for the bore 42, reduced spring-centering and movement-limiting portions 77 at the opposite sides of the portion 76, and further extended, further reduced portions 78 at each end of the valve member. The portions 78 coact with the bores 71 to form retarding cylinder and piston devices supplied with the operating liquid as later noted. The valve member is traversed throughout its length by a relatively small passage 79 which cooperates in the dash-pot functioning of the extensions 78 later described. Radial passages 80 open through each of the portions 78 into communication with the longitudinal passage 79 in positions to be closed, by passage within the bores in the portions 73 just as the valve 75 approaches its extreme positions of movement. Means is provided to enable progressive increases in flow area as the valve body is displaced from mid-position. This means may take the form of tapering notches, either in the valve or in the walls of the valve casing. Herein, at the opposite ends of the main body portion 76 there are shown series of passages or notches 81 diminishing in depth towards the center of the body portion 76 and separated at their closest points by such a distance that in the mid-position of the valve element 75 neither of them communicates with either of the annular grooves or chambers 48 and 49.

The valve element 75 is normally maintained, in the absence of the exertion of hydraulic shifting pressure thereon, in its central position by springs 82, 82, supported on the sleeve portions 73 and on the spring-centering, movement-limiting portions 77. The distance which the valve 75 may move from central position is controlled by the amount of free travel provided between the spring-supporting portions 77 and the sleevelike portions 73.

The mode of operation may now be readily followed. When it is desired to effect propulsion of the coal cutting machine or other vehicle in a direction which will require the winding in of the current supply cable, the main valve device 17 may be actuated to effect the supply of liquid through the conduit 25 and to permit the return of liquid to the tank 11 through the conduit 26. The fluid passing through the conduit 25 will enter the chamber 46 and will be unable to pass the check valve device 59. It must accordingly, in order to attain access to the passage 53, do so by way of the chamber 48, and this it may do by displacing the valve element 75 to the right in Fig. 3. Since there is an unbalanced area on the left hand end of the head 76 and left hand portion 77 of the valve element 75, a force tending to move the valve to the right will be produced, but the rate at which valve movement will be possible will be controlled by the rate of displacement of fluid from the right hand chamber 71, and this rate will be controlled by the size of the passage 79. As the valve 75 commences to move toward the right in Fig. 3, the left hand set of tapering notches 81 will be moved to provide initially very small, but progressively increasing communication between the chamber 46 and the chamber 48, and in the extreme position to the right of the valve 75, there will be free communication between the chambers 46 and 48 through an annular opening, past the end of the body 76 of the valve 75. The fluid passing first through the notches 81 and then through the free annular opening last described will pass through the conduit 53 and will enter the wheel driving motor 3a directly through the conduit 53' and will effect rotation of motor 3a. Fluid will also pass through the automatic control device 31, to the reel driving motor 30 by way of conduit 54, and, after actuating that motor, will pass through the conduit 55, again through the valve device 31, and by way of the conduits 34 and 56 into the wheel driving motor 3b to drive the latter. Thus both wheel driving motors will be driven and the fluid, after doing its work in the wheel driving motors, will pass from the motors 3a and 3b respectively through the conduits 66 and 67 and the conduit 65, freely past the check valve device 64 into the chamber 47, and go by way of the conduit 26 and conduit 18 back to the tank. Accordingly it will be evident that instead of having movement of the valve mechanism 17 to admit fluid to the conduit 25 result in the sudden delivery of liquid at several hundred pounds pressure to the wheel driving motors, without other restriction or delay than the care of the operator will provide, there will be automatically, through the controlled movement of the valve 75, a highly desirable initially small and suitably accelerated admission of fluid to the wheel driving motors and a substantially complete avoidance of shock.

If it be desired to drive the wheels in the other direction, fluid may be admitted to the conduit 26, and, since it cannot pass through conduit 63 to conduit 65 directly, because of the check valve device 64, the fluid will have to move the valve 75 to the left, and be admitted at a controlled rate to the conduit 61, and from this conduit it will pass in part by way of conduit 65 and conduit 66 to motor 3a, from the latter through conduit 53' to conduit 53 and from the latter, past the check valve device 59, through chamber 46 and conduit 25, back to the valve device 17, and by way of port 19 and conduit 18 back to the reservoir 11. Another part of the fluid from conduit 65 will pass through conduit 67, through motor 3b, conduit 56, conduit 34, through the automatic valve device 31 without driving the reel, through a portion of conduit 33, and to conduit 53, and thence, with the other portion of the fluid, back to the reservoir 11.

When hydraulic fluid is supplied from the small capacity pump 8 under control of valve mechanism 29 shocks and jolts will also be avoided, because access of the fluid to the wheel driving motors will be possible only through the mechanism 40. When reel drive without wheel drive is desired, the valve mechanism 35 may be operated to effect this mode of operation, and the fluid for reel drive alone will not pass through the mechanism 40.

Referring again to Figure 3, it will be noted that the movement of the valve 75 in either direction is limited by engagement of the ends of the portions 77 with the stationary sleeve portions 73, that in such extreme positions of the valve 75 one end of the valve body 76 will permit fluid flow past it to one of the annular chambers 48 or 49, and that because one or the other of the passages 80 will be closed by reason of its position within one of the sleeve portions 73, there will be no flow between the supply and return lines through the conduit formed by 80, 79, 80, and so no loss of fluid without the doing of work thereby, when full supply to the motors is desired.

The areas on the ends of the valve body 76 outside the portions 77, and the ends of the portions 77 outside the further reduced portions 78 obviously constitute throwing areas—areas on which fluid acts to effect valve throwing.

All the fluid passing both to and from the wheel driving motors will pass through the mechanism 40, and only as the valve 75 is displaced at a controlled rate is the building up of flow rate to the wheel driving motors possible.

From the foregoing description it will be evident that I have provided an improved hydraulic system for the propulsion of vehicles by high pressure hydraulic fluid, and an improved automatic valve mechanism for providing an initial, restricted flow of operating fluid to a hydraulic propulsion motor, with automatically increasing rate of fluid supply (with such rate automatically controlled by the built in dashpot arrangement) until the maximum desired rate is attained, and that such mechanism is so constructed and arranged as to permit effective cooperation with reversible motor drives.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a source of hydraulic fluid under pressure, a motor for actuation by such fluid, operator controlled valve means controlling fluid supply to and fluid venting from said motor and associated conduit means between said valve means and said motor, and shiftable means for providing for an initially restricted, automatically increased freedom of communication between said valve means and said motor upon actuation of said operator controlled valve means to provide for relatively free flow of fluid past the same towards said motor and for relatively free communication between said motor and said operator controlled valve means upon actuation of the latter to provide for venting of fluid from said motor, said shiftable means including a valve device having a cylindrical central portion completely interrupting communication between said operator controlled valve means and said motor past such portion in one position of the latter.

2. In combination, a source of hydraulic fluid under pressure, a motor for actuation by such fluid, operator controlled valve means controlling fluid supply to and fluid venting from said motor and associated conduit means between said valve means and said motor, and means interposed in said conduit means for providing for an initially restricted, automatically increased freedom of communication between said valve means and said motor upon actuation of said operator controlled valve means to provide for relatively free flow of fluid past the same towards said motor and for relatively free communication between said motor and said operator controlled valve means upon actuation of the latter to provide for venting of fluid from said motor, said means interposed in said conduit means including a valve device having a cylindrical central portion completely interrupting communication between said operator controlled valve means and said motor past such portion in one position of the latter.

3. In combination, a source of hydraulic fluid under pressure, a motor for actuation by such fluid, operator controlled valve means controlling fluid supply to and fluid venting from said motor and associated conduit means between said valve means and said motor, and means having a surface thereon subjected to fluid moving towards said motor for effecting its own shifting to fluid supply effecting position for providing for an initially restricted, automatically increased freedom of communication between said valve means and said motor upon actuation of said operator controlled valve means to provide for relatively free flow of fluid past the same towards said motor and for relatively free communication between said motor and said operator controlled valve means upon actuation of the latter to provide for venting of fluid from said motor, said means having the surface thereon as aforesaid including a valve device having a cylindrical central portion completely interrupting communication between said operator controlled valve means and said motor past such portion in one position of the latter.

4. In combination, a source of hydraulic fluid under pressure, a motor for actuation by such fluid, operator controlled valve means controlling fluid supply to and fluid venting from said motor and associated conduit means between said valve means and said motor, and means interposed in said conduit means and having a surface thereon subjected to fluid moving towards said motor for effecting its own shifting to fluid supply effecting position for providing for an initially restricted, automatically increased freedom of communication between said valve means and said motor upon actuation of said operator controlled valve means to provide for relatively free flow of fluid past the same towards said motor and for relatively free communication between said motor and said operator controlled valve means upon actuation of the latter to provide for venting of fluid from said motor, said means interposed in said conduit means including a valve device having a cylindrical central portion completely interrupting communication between said operator controlled valve means and said motor past such portion in one position of the latter.

5. In combination, a source of hydraulic fluid under pressure, at least one reversible motor, supply and return conduits connected with said source, conduits connected with said motor and adapted alternatively to constitute fluid supply and fluid exhaust lines, operator controlled valve means for connecting said conduits connected with said motor in communication selectively one with said supply conduit and the other with said return conduit, and vice versa, and valve mechanism connected with said conduits connected with said motor for initially restricting the flow therethrough towards said motor and thereafter providing automatically at a controlled rate for an increased flow capacity, said valve mechanism including a cylinder, a piston reciprocable therein, and means providing for a restricted rate of displacement of fluid from said cylinder for controlling the time interval between the establishments of conditions respectively for restricted flow and for initiation of increased flow.

6. In combination, a source of hydraulic fluid under pressure, at least one reversible motor, supply and return conduits connected with said source, conduits connected with said motor and adapted alternatively to constitute fluid supply and fluid exhaust lines, operator controlled valve means for connecting said conduits connected with said motor in communication selectively one with said supply conduit and the other with said return conduit, and vice versa, and valve mechanism connected with said conduits connected with said motor for initially restricting the flow therethrough towards said motor and thereafter providing automatically for an increased flow capacity at a controlled rate, said valve mechanism including a single valve member actuated in opposite directions by the fluid passing towards said motor to actuate the same in opposite directions.

7. In combination, a source of hydraulic fluid under pressure, at least one reversible motor, supply and return conduits connected with said source, conduits connected with said motor and adapted alternatively to constitute fluid supply and fluid exhaust lines, operator controlled valve means for connecting said conduits connected with said motor in communication selectively one with said supply conduit and the other with said return conduit, and vice versa, and valve mechanism connected with said conduits connected with said motor for initially restricting the flow therethrough towards said motor and thereafter providing automatically for an increased flow capacity, said valve mechanism including a single valve member actuated in opposite directions by the fluid passing towards said motor to actuate the same in opposite directions and said valve mechanism having dashpot means associated with it for controlling its rate of movement.

8. In combination, a source of hydraulic fluid under pressure, at least one reversible motor, supply and return conduits connected with said source, conduits connected with said motor and adapted alternatively to constitute fluid supply and fluid exhaust lines, operator controlled valve means for connecting said conduits connected with said motor in communication selectively one with said supply conduit and the other with said return conduit, and vice versa, and valve mechanism connected with said conduits connected with said motor for initially restricting the flow therethrough towards said motor and thereafter providing automatically for an increased flow capacity, said valve mechanism including a single valve member actuated in opposite directions by the fluid passing towards said motor to actuate the same in opposite directions and said valve mechanism having dashpot means associated with it for controlling its rate of movement and having passage means of increasing flow area with increased valve displacement.

9. In combination, in an apparatus for providing for an initially restricted, automatically increasing flow passage area for operating fluid for a motor device, a casing having a valve receiving bore therein, a valve reciprocable in said bore, a pair of spaced chambers communicating with said bore at one side of a plane extending transversely thereof, another pair of spaced chambers communicating with said bore at the other side of said plane, said valve having a portion, of at least as great diameter at its longitudinal center as at its ends, for preventing, in the mid-position of said valve, communication between the chambers of either pair and movable to effect interconnection, past the ends of said portion and of a flow area increasing with displacement of said valve from mid-position, through said valve receiving bore of the chambers of one or the other of said pairs, said casing having connections for the supply of operating fluid from a source to the most remote chambers and for the venting of fluid from them, and said casing having connections communicating with the chambers nearest said plane and adapted for connection with alternative fluid supply and exhaust connections of a motor.

10. In combination, in an apparatus for providing for an initially restricted, automatically increasing flow passage area for operating fluid for a motor device, a casing having a valve receiving bore therein, a valve reciprocable in said bore, a pair of spaced chambers communicating with said bore at one side of a plane extending transversely thereof, another pair of spaced chambers communicating with said bore at the other side of said plane, said valve having a portion preventing, in the mid-position of said valve, communication between the chambers of either pair and movable in either direction from its mid-position to effect interconnection, of a flow area increasing with displacement of said valve from mid-position, through said valve receiving bore of the chambers of one or the other of said pairs, said casing having connections for the supply of operating fluid from a source to the most remote chambers and for the venting of fluid from them, and said casing further having connections communicating with the chambers nearest said plane and adapted for connection with alternative fluid supply and exhaust connections of a motor, and said portion of said valve being of at least as great diameter at its longitudinal center as at its ends.

11. In combination, in an apparatus for providing for an initially restricted, automatically increasing flow passage area for operating fluid for a motor device, a casing having a valve receiving bore therein, a valve reciprocable in said bore, a pair of spaced chambers communicating with said bore at one side of a plane extending transversely thereof, another pair of spaced chambers communicating with said bore at the other side of said plane, said valve having a portion preventing, in the mid-position of said valve, communication between the chambers of said pairs and movable to effect interconnection through said valve receiving bore of the chambers of one or the other of said pairs, and said valve portion having thereon means forming flow passages of increasing effective area as displacement from mid-position occurs, said casing having connections for the supply of operating fluid from a source to the most remote chambers and for the venting of fluid from them, and said casing further having connections communicating with the chambers nearest said plane and adapted for connection with alternative fluid supply and exhaust connections of a motor, and said portion of said valve being of at least as great diameter at its longitudinal center as at its ends.

12. In combination, in an apparatus for providing for an initially restricted, automatically increasing flow passage area for operating fluid for a motor device, a casing having a valve receiving bore therein, a valve reciprocable in said bore, a pair of spaced chambers communicating with said bore at one side of a plane extending transversely thereof, another pair of spaced chambers communicating with said bore at the other side of said plane, said valve having a portion preventing, in the mid-position of said valve, communication between the chambers of either pair and movable to effect interconnection through said valve receiving bore of the chambers of one or the other of said pairs, means providing flow passages of increasing area, as valve displacement occurs, between the chambers of one or the other of said pairs, said casing having connections for the supply of operating fluid from a source to the most remote chambers and for the venting of fluid from them, and said casing further having connections communicating with the chambers nearest said plane and adapted for connection with alternative fluid supply and exhaust connections of a motor, and said portion of said valve at its longitudinal center and at its ends having its periphery in a common cylindrical surface.

13. In combination, in an apparatus for providing for an initially restricted, automatically increasing flow passage area for operating fluid for a motor device, a casing having a valve receiving bore therein, a valve reciprocable in said bore, a pair of spaced chambers communicating with said bore at one side of a plane extending transversely thereof, another pair of spaced chambers communicating with said bore at the other side of said plane, said valve having a portion preventing, in the mid-position of said valve, communication between the chambers of either pair and movable to effect interconnection, of a flow area increasing with displacement of said valve from mid-position, through said valve receiving bore of the chambers of one or the other of said pairs, said casing having connections for the supply of operating fluid from a source to the most remote chambers and for the venting of fluid from them, and said casing having connections communicating with the chambers nearest said plane and adapted for connection with alternative fluid supply and exhaust connections of a motor, and means for establishing one-way flow connections between the chambers of each pair.

14. In combination, in an apparatus for providing for an initially restricted, automatically increasing flow passage area for operating fluid for a motor device, a casing having a valve receiving bore therein, a valve reciprocable in said bore, a pair of spaced chambers communicating with said bore at one side of a plane extending transversely thereof, another pair of spaced chambers communicating with said bore at the other side of said plane, said valve having a portion preventing, in the mid-position of said valve, communication between the chambers of either pair and movable to effect interconnection through said valve receiving bore of the chambers of one or the other of said pairs, means providing flow passages of increasing area, as valve displacement occurs, between the chambers of one or the other of said pairs and dashpot means associated with said valve for limiting its rate of movement, said casing having unitary connections for the supply of operating fluid from a source to the most remote chambers and for the venting of fluid from them, and said casing further having connections communicating with the chambers nearest said plane and adapted for connection with alternative fluid supply and exhaust connections of a motor.

15. In combination, in an apparatus for providing for an initially restricted, automatically increasing flow passage area for operating fluid for a motor device, a casing having a valve receiving bore therein, a valve reciprocable in said bore, a pair of spaced chambers communicating with said bore at one side of a plane extending transversely thereof, another pair of spaced chambers communicating with said bore at the other side of said plane, said valve having a portion preventing, in the mid-position of said valve, communication between the chambers of either pair and movable to effect interconnection through said valve receiving bore of the chambers of one or the other of said pairs, means providing flow passages of increasing area, as valve displacement occurs, between the chambers of one or the other of said pairs, and dashpot means associated with said valve for limiting its rate of movement, said dashpot means including extensions on said valve and chambers in said casing and passage means connecting the opposite ends of said valve with each other, said casing having connections for the supply of operating fluid from a source to the most remote chambers of said pairs and for the venting of fluid from them, and said casing having connections communicating with the chambers nearest said plane and adapted for connection with alternative fluid supply and exhaust connections of a motor.

16. In combination, in an apparatus for providing for an initially restricted, automatically increasing flow passage area for operating fluid for a motor device, a casing having a valve receiving bore therein, a valve reciprocable in said bore, a pair of spaced chambers communicating with said bore at one side of a plane extending transversely thereof, another pair of spaced chambers communicating with said bore at the other side of said plane, said valve having a portion preventing, in the mid-position of said valve, communication between the chambers of either pair and movable to effect interconnection through said valve receiving bore of the chambers of one or the other of said pairs, means providing flow passages of increasing area, as valve displacement occurs, between the chambers of one or the other of said pairs, and dashpot means associated with said valve for limiting its rate of movement, said dashpot means including extensions on said valve and chambers in said casing and passage means connecting said last mentioned chambers in restricted communication with each other, said casing having connections for the supply of operating fluid from a source to the most remote chambers of said pairs and for the venting of fluid from them, and said casing having connections communicating with the chambers nearest said plane and adapted for connection with alternative fluid supply and exhaust connections of a motor.

17. In combination, in an apparatus for providing for an initially restricted, automatically increasing flow passage area for operating fluid for a motor device, a casing having a valve receiving bore therein, a valve reciprocable in said bore, a pair of spaced chambers communicating with said bore at one side of a plane extending transversely thereof, another pair of spaced chambers communicating with said bore at the other side of said plane, said valve having a portion preventing, in the mid-position of said valve, communication between the chambers of either pair and movable to effect interconnection through said valve receiving bore of the chambers of one or the other of said pairs, means providing flow passages of increasing area, as valve displacement from mid-position occurs, between the chambers of one or the other of said pairs, and dashpot means associated with said valve for limiting its rate of movement, said dashpot means including extensions on said valve and chambers in said casing and passage means extending through said valve for connecting the opposite ends of said valve with each other, said casing having connections for the supply of operating fluid from a source to the most remote chambers of said pairs and for the venting of fluid from them, and said casing having connections communicating with the chambers nearest said plane and adapted for connection with alternative fluid supply and exhaust connections of a motor.

18. In combination, in an apparatus for providing for an initially restricted, automatically increasing flow passage area for operating fluid for a motor device, a casing having a valve receiving bore therein, a valve reciprocable in said bore, a pair of spaced chambers communicating with said bore at one side of a plane extending transversely thereof, another pair of spaced chambers communicating with said bore at the other side of said plane, said valve having a portion preventing, in the mid-position of said valve, communication between the chambers of either pair and movable to effect interconnection through said valve receiving bore of the chambers of one or the other of said pairs, means providing flow passages of increasing area, as valve displacement from mid-position occurs, between the chambers of one or the other of said pairs, and dashpot means associated with said valve for limiting its rate of movement, said dashpot means including cooperating recesses and projections relatively movable upon valve movement and means for connecting said recesses in restricted communication with each other and, in the mid but not the extreme positions of said valve, with the valve receiving bore at both sides of said valve portion, said casing having connections for the supply of operating fluid from a source to the most remote chambers and for the venting of fluid from them, and said casing having connections communicating with the chambers nearest said plane and adapted for connection with alternative fluid supply and exhaust connections of a motor.

19. In combination, a source of hydraulic fluid under pressure, a reversely rotatable motor for actuation by such fluid and having a pair of connections each serving alternatively as a supply passage for operating fluid and as an exhaust connection through which exhausting fluid is discharged as further fluid enters the motor through the other, operator controlled valve means and associated conduit means for effecting operator controlled supply of fluid from said source to one or the other of said connections to said motor to effect operation of said motor selectively in either direction, and exhaust, during motor operation and through the connection not serving for fluid supply, of fluid from said motor, irrespective of the direction of operation of said motor, and valve means interposed in said conduit means for providing, irrespective of the direction of rotation of said motor, an initially restricted, automatically increasing freedom of communication between said operator controlled valve means and said motor upon actuation of said operator controlled valve means to provide for relatively free flow of fluid past the same, said last recited valve means having, to control the rate of increase of freedom of communication, retarding means including cylinder and piston mechanism providing chambers from which fluid must be displaced as increasing freedom of communication occurs and having restricted communication with said source when said operator controlled valve means supplies fluid from said source to said motor.

20. In combination, a source of hydraulic fluid under pressure, at least one reversible motor, supply and return conduits connected with said source, conduits connected with said motor and adapted alternatively to constitute fluid supply and fluid exhaust lines, operator controlled valve means for connecting said conduits connected with said motor in communication selectively one with said supply conduit and the other with said return conduit, and vice versa, and valve mechanism connected with said conduits connected with said motor for initially restricting the flow therethrough towards said motor and thereafter providing automatically for an increased flow capacity, said valve mechanism including a single valve member having thereon throwing areas spaced from its ends and alternatively subjected to fluid passing towards said motor to actuate the same in opposite directions and further having portions constituting dash pot elements for controlling its rate of movement.

21. In combination, a source of hydraulic fluid under pressure, at least one reversible motor, supply and return conduits connected with said source, conduits connected with said motor and adapted alternatively to constitute fluid supply and fluid exhaust lines, operator controlled valve means for connecting said conduits connected with said motor in communication selectively one with said supply conduit and the other with said return conduit, and vice versa, and valve mechanism connected with said conduits connected with said motor for initially restricting the flow therethrough towards said motor and thereafter providing automatically for an increased flow capacity, said valve mechanism including a single valve member having thereon throwing areas spaced from its ends and alternatively subjected to fluid passing towards said motor to actuate the same in opposite directions and further having portions at its ends constituting dash pot elements for controlling its rate of movement.

22. In combination, a source of hydraulic fluid under pressure, at least one reversible motor, supply and return conduits connected with said source, conduits connected with said motor and adapted alternatively to constitute fluid supply and fluid exhaust lines, operator controlled valve means for connecting said conduits connected with said motor in communication selectively one with said supply conduit and the other with said return conduit, and vice versa, and valve mechanism connected with said conduits connected with said motor for initially restricting the flow therethrough towards said motor and thereafter providing automatically for an increased flow capacity, said valve mechanism including a single valve member having thereon throwing areas spaced from its ends and alternatively subjected to fluid passing towards said motor to actuate the same in opposite directions and further having portions at its ends constituting dash pot elements for controlling its rate of movement, said valve member further having a passage extending through the same from end to end.

CLYDE P. BALDWIN.

REFERENCES CITED

The following references are of record in the file of this patent:

UNITED STATES PATENTS

| Number | Name | Date |
|---|---|---|
| 519,436 | Schweim | May 8, 1894 |
| 588,946 | Bergman | Aug. 31, 1897 |
| 1,469,006 | Lewis | Sept. 25, 1923 |
| 1,590,226 | Boisset | June 29, 1926 |
| 1,708,507 | Jordan | Apr. 9, 1929 |
| 1,943,061 | Douglas | Jan. 9, 1934 |
| 2,000,805 | West et al. | May 7, 1935 |
| 2,021,580 | Osgood | Nov. 19, 1935 |
| 2,157,240 | Keel | May 9, 1939 |
| 2,362,349 | Bryant | Nov. 7, 1944 |
| 2,370,526 | Doran | Feb. 27, 1945 |
| 2,387,307 | Stone | Oct. 23, 1945 |
| 2,391,930 | Stone | Jan. 1, 1946 |
| 2,401,258 | Livers | May 28, 1946 |
| 2,450,733 | Lane et al. | Oct. 5, 1948 |